(12) United States Patent
Stecewycz

(10) Patent No.: US 9,815,378 B2
(45) Date of Patent: Nov. 14, 2017

(54) POLARIZED BATTERY CLAMP AND BOOSTER CABLE

(71) Applicant: Joseph Stecewycz, Groton, MA (US)

(72) Inventor: Joseph Stecewycz, Groton, MA (US)

( * ) Notice: Subject to any disclaimer, the term of this patent is extended or adjusted under 35 U.S.C. 154(b) by 120 days.

(21) Appl. No.: 14/931,813

(22) Filed: Nov. 3, 2015

(65) Prior Publication Data

US 2016/0185242 A1 Jun. 30, 2016

Related U.S. Application Data

(63) Continuation-in-part of application No. 14/085,784, filed on Nov. 20, 2013, now Pat. No. 9,178,292.

(51) Int. Cl.

| B60L 11/18 | (2006.01) |
|---|---|
| H02J 7/00 | (2006.01) |
| H01R 4/48 | (2006.01) |
| H01R 4/50 | (2006.01) |
| H01R 11/28 | (2006.01) |

(52) U.S. Cl.
CPC .......... *B60L 11/1818* (2013.01); *H01R 4/489* (2013.01); *H01R 4/5008* (2013.01); *H01R 11/282* (2013.01); *H02J 7/0029* (2013.01); *H02J 7/0042* (2013.01); *Y10T 29/49174* (2015.01)

(58) Field of Classification Search
CPC ... B60L 11/1818; H01R 11/282; H01R 4/489; H01R 4/5008; H02J 7/0042; H02J 7/0029; Y10T 29/49174
See application file for complete search history.

(56) References Cited

U.S. PATENT DOCUMENTS

| 4,376,965 | A | * | 3/1983 | Bacevius | ............ | F21V 21/0885 |
|---|---|---|---|---|---|---|
| | | | | | | 362/103 |
| 4,934,957 | A | * | 6/1990 | Bellusci | ................ | H01R 11/24 |
| | | | | | | 439/504 |
| 5,041,028 | A | * | 8/1991 | Stohle | ...................... | B25B 5/06 |
| | | | | | | 439/822 |
| 6,364,719 | B1 | * | 4/2002 | Chopra | ................ | H01R 11/282 |
| | | | | | | 439/759 |
| 6,448,503 | B1 | * | 9/2002 | McKinnon | ............... | H02G 7/12 |
| | | | | | | 174/146 |
| 6,872,099 | B2 | * | 3/2005 | Cret | ..................... | H01R 11/282 |
| | | | | | | 439/716 |
| 7,658,641 | B1 | * | 2/2010 | Maxwell | .............. | H01R 4/5025 |
| | | | | | | 439/548 |

* cited by examiner

*Primary Examiner* — Michael Zarroli
(74) *Attorney, Agent, or Firm* — Joseph Stecewycz

(57) ABSTRACT

A polarized battery clamp includes a contact handle with an internal electrical path connecting a handle electrical connector at one end of the contact handle to a terminal contact pad at a second handle end, the contact handle also having an internal electrical contact bus connected to the electrical connector; and a contact arm having a terminal contact pad at a first arm end and a stepped pivot pin at a second arm end, the contact arm also having an electrical conductor electrically connected to the arm terminal contact pad; wherein the electrical conductor is placed into electrical contact with the electrical contact bus by inserting the stepped pivot pin into a handle positional slot.

20 Claims, 15 Drawing Sheets

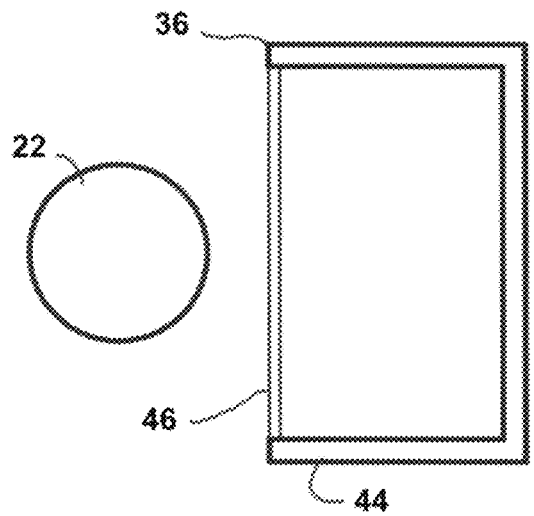
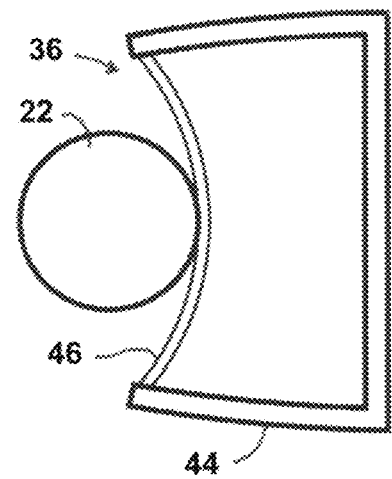
Fig. 3A    Fig. 3B
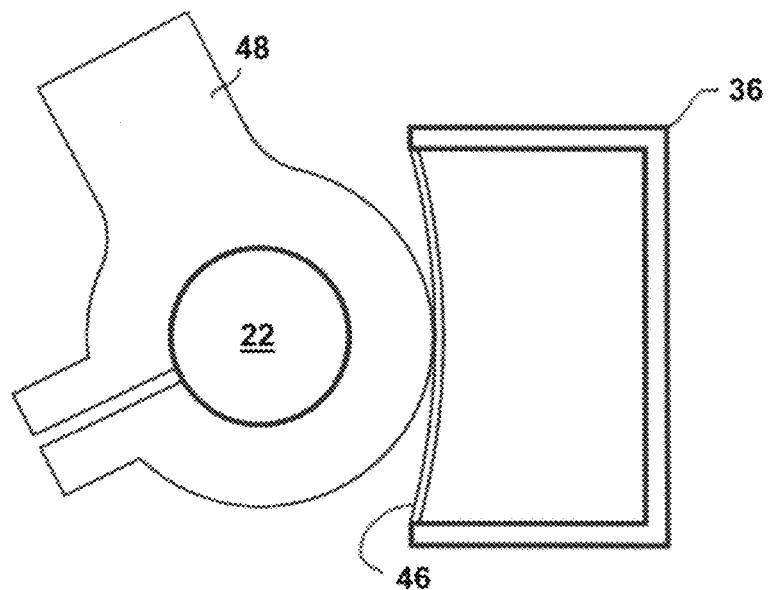
Fig. 4

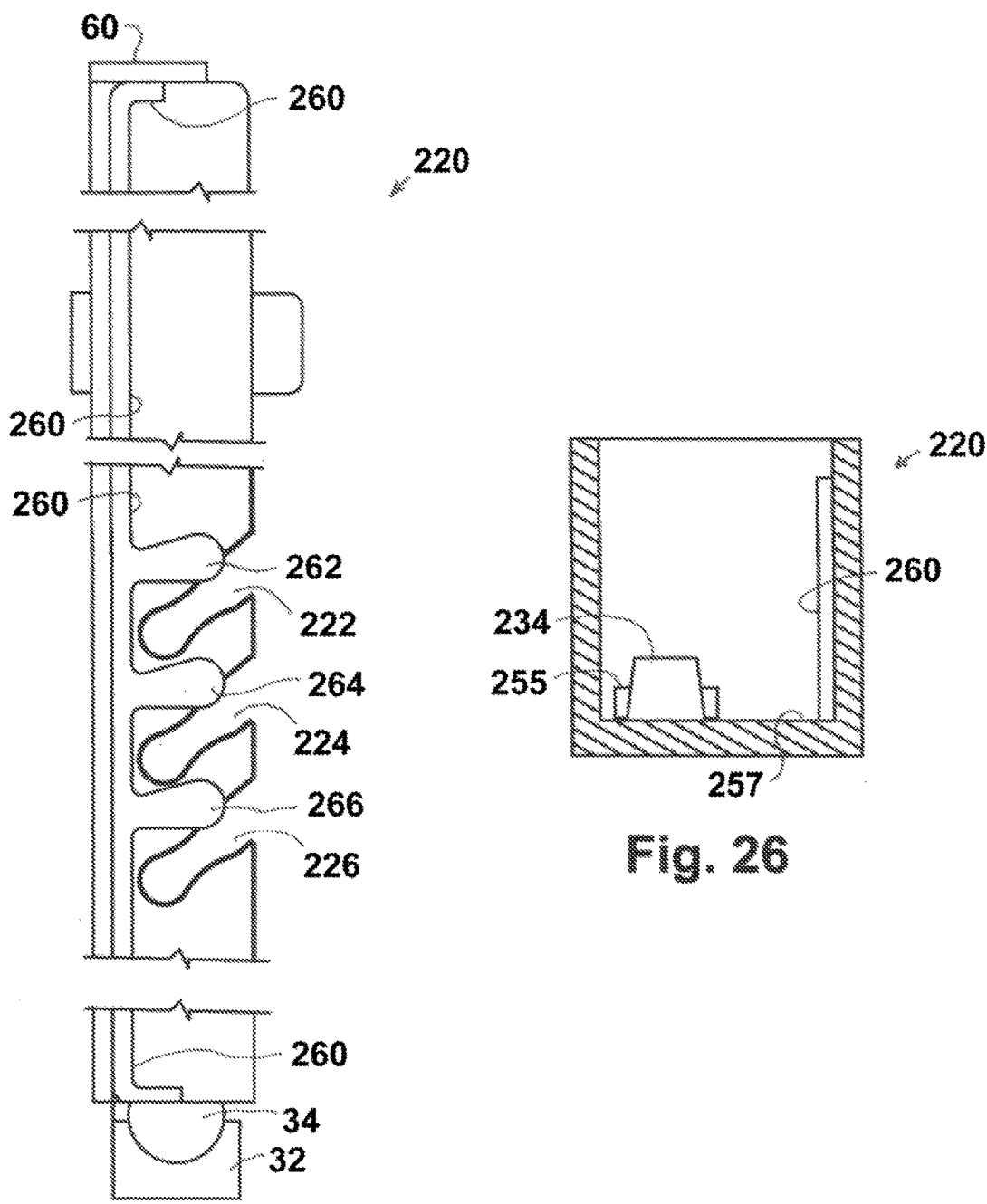

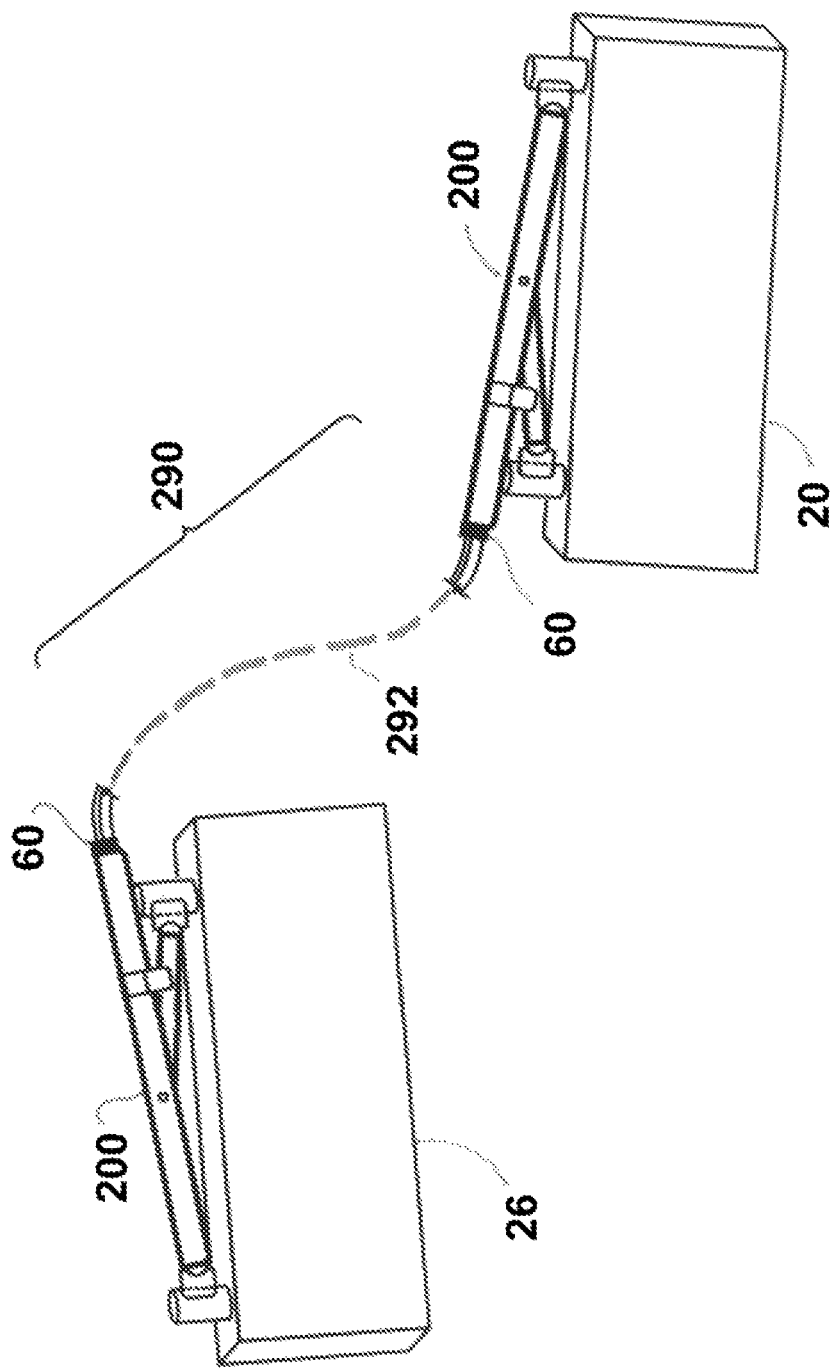

POLARIZED BATTERY CLAMP AND BOOSTER CABLE

CROSS REFERENCE TO RELATED APPLICATION

The present Application is a Continuation-in-Part of Utility patent application Ser. No. 14/085,784 entitled "Compact Battery Clamp and Booster Cable," filed 20 Nov. 2013, issued as U.S. Pat. No. 9,178,292, incorporated herein by reference in its entirety.

FIELD OF THE INVENTION

This invention relates to a device for providing a method of electrically connecting to the terminals of a battery and, in particular, a polarized device for ensuring an electrical connection of a correct polarity to the terminals of a lead-acid battery.

BACKGROUND OF THE INVENTION

Battery cables, or booster cables, such as used in "jump starting" a vehicle, have been known in the art for some years. A set of booster cables typically includes a six-foot length of a two insulated electrical conductors of sufficient gauge to safely conduct starting current amperage. Four booster clamps, or battery clamps, resembling clothes pins and referred to as "crocodile clips," are provided at respective ends of the booster cable electrical conductor pair so as to electrically couple either two batteries, or one battery and a battery charger.

A conventional booster cable configures the battery clamps with serrated jaw ends to make mechanical and electrical contact with: (i) battery terminals or posts, if the battery is not installed in a vehicle, or (ii) vehicle battery cable terminals, if the battery is installed in a vehicle with the vehicle battery cable terminals secured onto the battery posts or terminals. The battery clamps are spring-loaded to force the clamp jaw serrations against the battery post or against the vehicle battery cable terminals, so as to provide a positive electrical connection to the respective battery post or to the vehicle battery cable terminal.

However, conventional battery clamps suffer from the shortcoming that the serrated ends of the battery clamps, typically made from copper or a copper alloy, cause indentations and other surface damage to the battery posts or vehicle cable terminals, which are typically made from lead—a softer metal than copper. Over time, the appearance and effectiveness of the battery posts or the vehicle cable terminals may suffer from repeated attachment of the booster cable.

Another shortcoming is that one of the battery clamps may be accidentally dropped into the vehicle chassis or engine compartment when a user is in the process of connecting or disconnecting the booster cable from a battery. If the vehicle is a negative-ground system, and it is the negative battery clamp that is dropped, a short circuit may result by conducting electrical current from the positive battery terminal into the chassis or engine components, and back into the battery, producing electrical arcing or sparking, and possibly igniting hydrogen gas being expelled from the charging battery.

A further shortcoming is that the connection of the booster cable to the battery typically requires using both hands to hold apart the booster clamps when securing the booster cable to the battery so as to not short out a battery connected to the other end of the booster cable. One-handed operation is not a practical alternative. Moreover, an average motorist may be unfamiliar with the proper polarity that must be observed when connecting two batteries in two different vehicles. Although many lead-acid batteries have (+) and (−) indicators on the battery posts, or a red electrical cable routed to the positive terminal, these markings may not be easily seen if the surface of the battery is soiled from oil, dirt, and white chemical powder at a battery post. If the wrong polarity is made, sparks may fly when the improper connection is made.

What is needed is a battery clamp configuration that overcomes the limitations of the prior art by providing a method to secure a booster cable to a battery without causing surface damage to lead-based components, while providing a good electrical contact, while assuring proper polarity, which prevents inadvertent battery discharge, and which requires only one hand to attach or to remove the booster cable from a battery.

BRIEF SUMMARY OF THE INVENTION

In an aspect of the present invention, a polarized battery clamp suitable for attachment to a high-amperage, two-conductor, insulated electrical cable for charging a battery, comprises, a contact handle with at least one positional slot, the contact handle having a ground-side conductive path electrically connecting an electrical connector at a first end of the contact handle to a contact handle terminal contact pad at a second end of the contact handle, the contact handle further having an electrical contact bus with a first bus end connected to the electrical connector; and a contact arm having a contact arm terminal contact pad at a first end of the contact arm and a stepped pivot pin at a second end of the contact arm, the contact arm further having an electrical conductor with a first electrical conductor end electrically connected to the contact arm terminal contact pad; wherein a second end of the electrical conductor is placed into electrical contact with a second end of the electrical contact bus by inserting the stepped pivot pin into at least one positional slot.

The additional features and advantage of the disclosed invention is set forth in the detailed description which follows, and will be apparent to those skilled in the art from the description or recognized by practicing the invention as described, together with the claims and appended drawings.

BRIEF DESCRIPTION OF THE DRAWINGS

The uses and advantages of the present invention will be more fully appreciated as the same becomes better understood from the following detailed description of the present invention when viewed in conjunction with the accompanying figures, in which:

FIG. 3A is a detail view of a terminal contact pad used in the compact battery clamp of FIG. 1;

FIG. 3B is a detail view of the terminal contact pad of FIG. 3A when positioned against a battery terminal;

FIG. 4 is a detail view of the terminal contact pad of FIG. 3 when positioned against a battery cable clamp;

FIG. 25 is a cross-sectional view of the two-piece polarized battery clamp of FIG. 22, showing a ground side conductive path;

FIG. 26 is cross-sectional view of the two-piece polarized battery clamp of FIG. 25 showing an electrical contact bus, a ground fault interrupter, and a ground return on a channel bottom surface;

FIG. 35 is an exemplary embodiment of a booster cable comprising the two-piece polarized battery clamp of FIG. 21 electrically coupled to opposite ends of a high-amperage, two-conductor, insulated electrical cable, in accordance with the present invention.

DETAILED DESCRIPTION OF THE INVENTION

Figure 1:
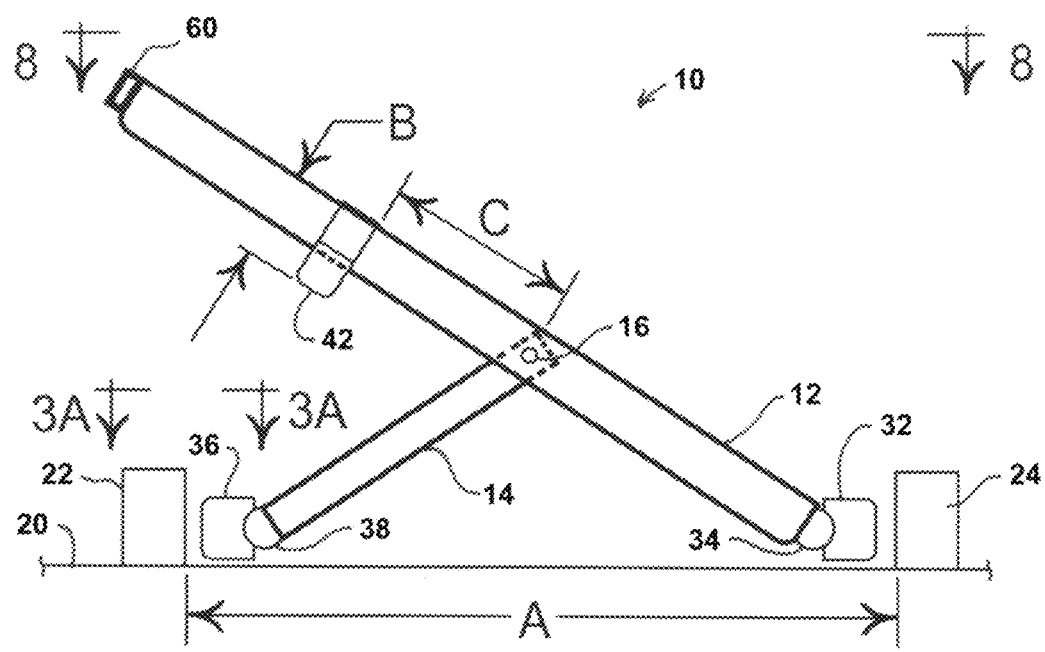
FIG. 1 is a diagrammatical illustration of a compact battery clamp in an open emplacement configuration, in accordance with an aspect of the present invention.

There is shown in FIG. 1 a side view of a compact battery clamp 10, in accordance with an aspect of the present invention. The compact battery clamp 10 comprises a clamp handle 12 with a contact arm 14, hingedly secured to the clamp handle 12 by a pivot pin 16 in a first end of the contact arm 14, the pivot pin 16 passing through both the clamp handle 12 and the contact arm 14. In the configuration shown, first end of the contact arm 14 is connected at or near the mid-point of the clamp handle 12, being thus enabled to swing through an arc of up to 180 degrees, limited only be contact with the clamp handle 12. The clamp handle 12 may comprise primarily an electrically non-conducting or insulating material, such as a high-impact plastic or a composite material, with internally-disposed electrical conductors as shown below in FIG. 12. As shown in the cross-sectional view of FIG. 13, below, the clamp handle 12 comprises a U-shaped channel, to provide strength and rigidity, while allowing rotational movement of the contact arm 14 within the open region inside the clamp handle 12.

Figure 2:
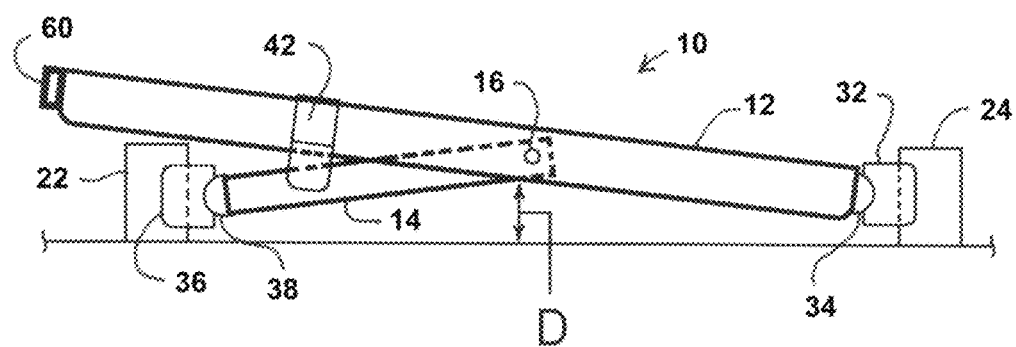
FIG. 2 is a diagrammatical illustration showing the compact battery clamp of FIG. 1, with a clamp handle and a control arm, in a closed, functioning configuration.

When in use, a user may grasp the upper portion of the clamp handle 12, and position the compact battery clamp 10 between terminals 22 and 24 of a battery 20, substantially as shown, where battery terminal 22 is the positive post. The compact battery clamp 10 is configured so as to maintain electrical contact with both the terminals 22 and 24 after the clamp handle 12 has been moved downwardly, towards the battery 20, as shown in FIG. 2. When in the configuration of FIG. 2, the compact battery clamp 10 functions as, and is a replacement for, a pair of conventional battery terminal clamps, or crocodile clips, as may be found in a typical set of a battery booster cable.

The clamp handle 12 may include a first terminal contact pad 32 rotatably attached to a first end of the clamp handle 12 by means of a first swivel connector 34. The first swivel connector 34 provides the terminal contact pad 32 with at least two degrees of freedom with respect to the clamp handle 12, so that the terminal contact pad 32 can be optimally swiveled and positioned against the battery terminal 24 to maximize the extent of a physical contact area. It should be understood that the contact pad may optimally position against the battery terminal 24 without requiring any adjustment from the user.

The contact arm 14 similarly includes a second terminal contact pad 36 rotatably attached to a second end of the contact arm 14 by means of a second swivel connector 38. In an exemplary embodiment, the swivel connectors 34 and 38 may each comprise a ball and socket connector pair, as known in the relevant art. This swiveling feature optimizes the area of electrical contact of the compact battery clamp 10 with the battery terminals 22 and 24, and results in a minimal voltage drop across the respective contact interfaces. It should be understood that the particular terminal contact pads 32 and 34 shown are merely exemplary of electrical connection devices that may be used at the first end of the clamp handle 12 and at the end of the contact arm 14, and that any suitable electrical contact component may be used to perform the same functions as the terminal contact pads 32 and 34.

Accordingly, when in an "open" position, shown in FIG. 1, the compact battery clamp 10 can be placed into and positioned within the open space between the terminals 22 and 24, here identified as the linear space denoted by the dimension "A." When in the open position, the clamp handle 12 and the contact arm 14 define a shape similar to the Greek letter "lambda," where the contact arm 14 corresponds to the shorter "leg" of the lambda shape.

When in a "closed" position, shown in FIG. 2, the lambda shape of the compact battery clamp 10 may be reduced in height by moving apart the terminal contact pads 32 and 36. This action serves to move the terminal contact pad 32 toward the battery terminal 24, and the terminal contact pad 36 toward the battery terminal 22. Thus, in the extended configuration shown in FIG. 2, the terminal contact pad 36 has been forced against the battery terminal 22 and the terminal contact pad 32 has been forced against the battery terminal 24.

In an exemplary embodiment, the compact battery clamp 10 can be configured so that an open space is defined between the battery 20 and the underside of the compact battery clamp 10, here indicated as dimension "D." The empty space may be desired to provide clearance for a battery retaining strap, a bracket, or a battery vent cover disposed on the surface of the battery 20 after the compact battery clamp 10 has been placed into the extended configuration.

In an exemplary embodiment, the clamp handle 12 can be releasably secured in the closed position by means of a U-spring clamp 42. By lowering the clamp handle 12 onto the contact arm 14, as shown in FIG. 2, the free ends of the U-spring clamp 42 engage both sides of the contact arm 14. The lengths of the cantilever arms of the U-spring clamp 42, here indicated as dimension "B," are preferably of sufficient length so as to partially enclose at least a portion of the contact arm 14 when the compact battery clamp 10 makes contact with the battery terminals 22 and 24.

Additionally, the selection of spring material used for the U-spring clamp 42 may produce a spring constant of sufficiently large value that the compressive force induced by the arms of the U-spring clamp 42 onto the sides of the contact arm 14 results in enough surface static friction to mitigate relative movement of the clamp handle 12 with respect to the contact arm 14. In an alternative embodiment, the contact arm 14 may include a pair of dimple features (not shown) sized and positioned on the outer surface if the contact arm 14 so as to more positively engage and retain the free ends of the U-spring clamp 42, as is well-known in the relevant art. In an alternative embodiment (not shown), the upper portion of the clamp handle 12 may be slightly curved away from the contact arm 14 so as to provide additional clearance between the upper portion of the clamp handle 12 and the battery 20 to more easily accommodate the hand of the user.

As explained above, the U-spring clamp 42 is configured to enclose and frictionally remain in position on the contact arm 14, and thus functions to restrain the clamp handle 12 from moving off the contact arm 14. The compact battery clamp 10 is, in this manner, maintained in a state of compression between the battery terminals 22 and 24 when the battery clamp 10 is emplaced for use as intended. As can be appreciated by one skilled in the art, this state of compression serves to increase the electrical conductivity at the interfaces between the battery terminals 22 and the terminal contact pads 32 and 36 of the compact battery clamp 10. In an exemplary embodiment, the U-spring clamp 42 may be re-positioned along the clamp handle 12 by a sliding motion, to change the distance from the pivot pin 16 as desired, the distance here indicated as dimension "C." In an alternative embodiment, the FIGS. 3A and 3B provide detail views of the top of the terminal contact pad 36 both before and after contact has been made with the battery terminal 22. The terminal contact pad 36 may comprise a generally U-shaped electrically-conductive contact body 44, such as a copper or aluminum alloy, and a flat flexible electrically-conductive terminal contact foil 46 attached to the legs of the terminal contact body 44, so as to form a rectangular cylinder having open ends, substantially as shown. The configuration of the terminal contact pad 32 is substantially similar to that of the terminal contact pad 36.

The thickness of the contact body 44 is preferably greater than the thickness of the terminal contact foil 46. Alternatively, the rigidity of the contact body 44 is preferably greater than the rigidity of the terminal contact foil 46. This configuration allows the terminal contact foil 46 to assume a generally curved shape, approximating the convex circumferential surface of the battery terminal 22, when forced against the battery terminal 22. This configuration also serves to return the terminal contact foil 46 to a generally planar shape when the terminal contact pad 36 is moved away from the battery terminal 22, as shown in FIG. 3B. When the terminal contact pad 36 is forced against the battery terminal 22, shown in FIG. 3B, it can be seen that the contact body 44 generally retains its shape because of the greater rigidity and wall thickness of the contact body 44.

It can thus be appreciated that the legs of the terminal contact body 44 are slightly bent inwardly when the terminal contact pad 36 is forced against the battery terminal 22, and spring back when the terminal contact pad 36 is removed from the battery terminal 22. By enabling the terminal contact foil 46 to partially wrap about the battery terminal 22, when the compact battery clamp 10 is placed into a state of tension, a greater contact area is achieved with the battery terminal 22, than if the terminal contact foil 46 remained flat, or if the terminal contact pad 36 were fabricated as a single, rigid component.

This configuration also allows for use of the compact battery clamp 10 when a vehicle battery cable clamp 48 is attached to either or both the battery terminals 22 and 24, such as may be the case when the battery 20 is mounted in a vehicle engine compartment. It can be readily appreciated by one skilled in the relevant art that the vehicle battery cable clamp 48 has a larger diameter than the battery terminal 22 and, because of flexibility of the terminal contact foil 46, the terminal contact foil 46 can partially wrap around both the battery cable clamp 48 and the battery terminal 22 so as to increase the area of physical and electrical contact. The compact battery clamp 10 can thus be used in the process of charging the battery 20 (i) when the battery 20 has been removed from a vehicle and placed on a work bench, or (ii) when the battery 20 remains secured in an vehicle engine compartment and is electrically connected to a pair of vehicle battery cable clamps 48.

Figure 5:
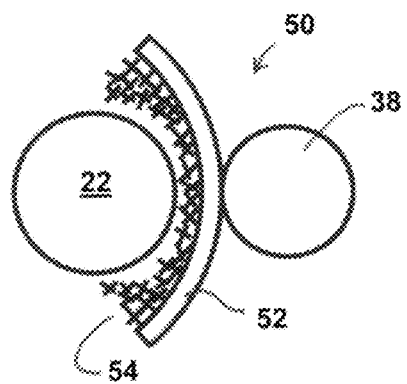
FIG. 5 is a detail view of an alternative configuration of a terminal contact pad including wire mesh, for use in the compact battery clamp of FIG. 1.

In an alternative exemplary embodiment, a terminal contact pad 50, shown in FIG. 5, may be used on the end of the end of the contact arm 14, in place of the terminal contact pad 36. Likewise, the terminal contact pad 50 may be used on the end of the clamp handle 12, in place of the terminal contact pad 32. The terminal contact pad 50 comprises one or more layers of a wire mesh 54 attached to the inside a terminal contact cup 52. The wire mesh 54 preferably comprises a corrosion-resistant metal or metal alloy, such as stainless steel or an aluminum alloy.

Figure 6:
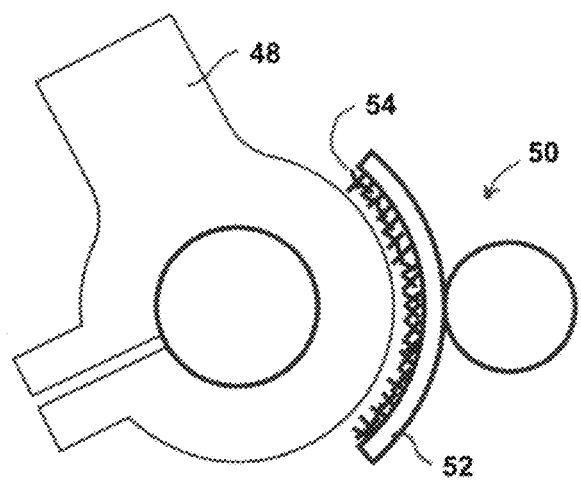
FIG. 6 is a detail view of the terminal contact pad of FIG. 5 when positioned against a battery cable clamp.

The terminal contact cup 52 is sized and shaped so as to generally conform to: (i) the outer surface contour of the battery terminal 20, as shown in FIG. 5, as well as (ii) to the outer surface contour of the battery cable clamp 48, as shown in FIG. 6. That is, the terminal contact cup 52 presents a cylindrical concave surface to the battery terminal 20. The configuration shown serves to increase the surface area of electrical contact between the terminal contact pad 50 and the battery terminal 22, for example, than if no wire mesh 54 were provided on the terminal contact cup 52.

As can be appreciated, the contact cup 52 may be too inflexible to usefully conform to the outer contour of the battery terminal 22 or to the outer contour of the battery cable clamp 48. Consequently, electrical resistance is thereby reduced between the terminal contact pad 50 and the battery terminal 22, and between the terminal contact pad 50 and the battery cable clamp 48. In addition, the terminal contact cup 52 may be mounted to the swivel connector 38 for the reasons stated above.

Figure 7:
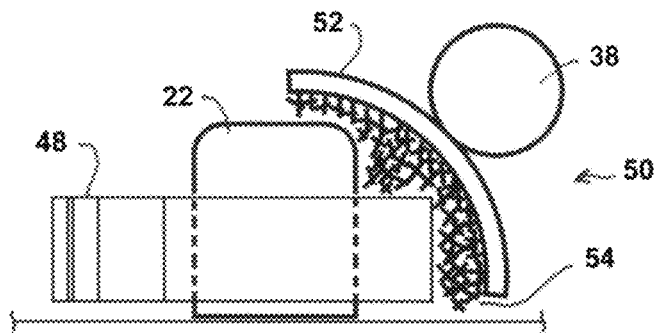
FIG. 7 is a detail view of the terminal contact pad of FIG. 5 when positioned against both a battery cable clamp and a battery terminal.

As shown in FIG. 7, the terminal contact pad 50 can be rotated ninety degrees, more or less, about the longitudinal axis of the contact arm 14 and positioned so as to physically and electrically contact both the battery cable clamp 48 and the battery terminal 22. It can be appreciated by one skilled in the art that, when the compact battery clamp 10 is placed in a compression state between the battery terminals 22 and 24, or between battery cable clamps 48, the wire mesh 54 is selectively compressed to generally conform to and substantially decrease the air voids between the terminal contact cup 52 and the battery terminal 22, as in FIG. 5, or between the terminal contact cup 52 and the battery cable clamp 48, as in FIG. 6, or between the terminal contact cup 52 and both the battery terminal and the battery cable clamp 48, as in FIG. 7. As stated above, this compressible feature of the wire mesh 54 serves to increase the surface contact area between the respective components, and thus increases the electrical conductance between the respective components.

Figure 8:
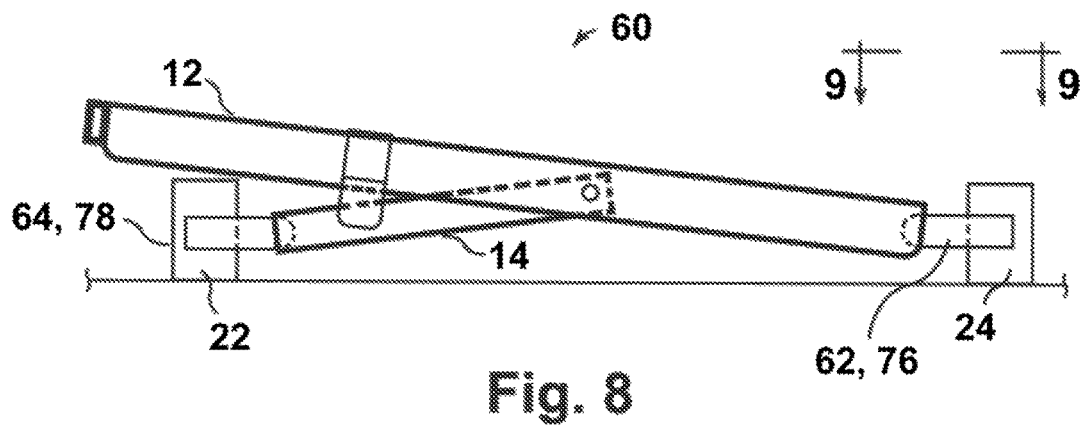
FIG. 8 is an alternative embodiment of the compact battery clamp of FIG. 1 in a closed emplacement configuration.

FIG. 8 illustrates an exemplary configuration of a compact battery clamp 60 which is adapted for use primarily with battery terminals 22, but which can also accommodate the larger diameter battery cable clamps 48. The compact battery clamp 60 includes a first terminal contact pad 62 attached to an end of the clamp handle 12, and a second terminal contact pad 64 attached to an end of the contact arm 14. The terminal contact pads 62, 64 are configured to provide mechanical and electrical contact with the outer surface of respective battery terminals 24, 22. The compact battery clamp 60 thus provides for electrical contact with a battery having terminals of different diameters, as is typically found in most lead-acid batteries.

Figure 9:
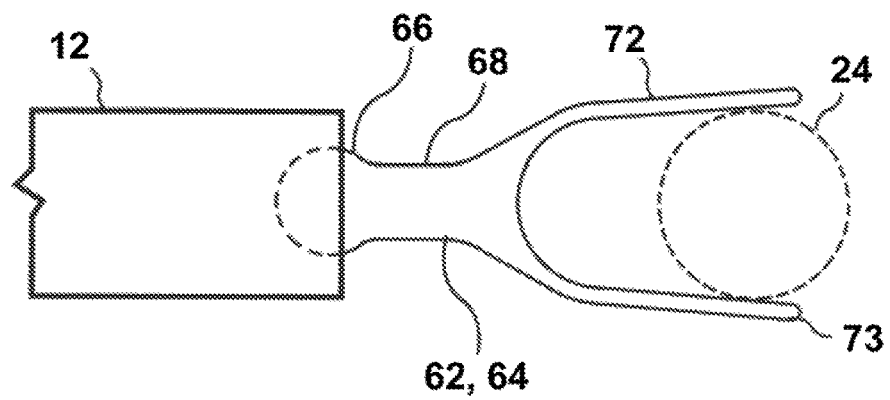
FIG. 9 is a detail illustration of a terminal contact pad of the compact battery clamp of FIG. 18.

FIG. 9 provides a detail top view of the terminal contact pads 62, 64. The terminal contact pad 62 includes an attachment end 66 for mechanical and electrical coupling to the end of the clamp handle 12. Although the illustration shown a rotatable attachment configuration, such as a ball and socket interface, the terminal contact pad 62 may be rigidly fixed to the clamp handle in an alternative embodiment. The terminal contact pad 62 further includes a pad body 68 extending from the attachment end 66, and two opposed pad fingers 72, 73 extending from the pad body 68, the pad fingers 72, 73 forming a substantially "U-shape," or the shape of a tuning fork, as shown.

Figure 18:
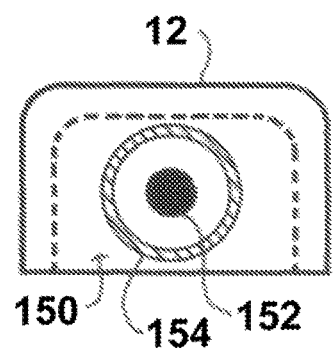
FIG. 18 is a diagrammatical of yet another exemplary embodiment of an electrical socket having a coaxial opening configuration for mating with a coaxial plug on a pair of battery cable conductors.

The pad fingers 72, 73 have a narrow thickness which allows for flexing when a user pushes the terminal contact pad 62 over the battery terminal 24. This causes the pad fingers 72, 73 to produce a compressive force onto the battery terminal 24 which results in an optimal mechanical and electrical contact with the battery terminal 24. The terminal contact pad 64, shown in FIG. 18, is substantially similar to the terminal contact pad 62, but is sized to conform to the battery terminal 22.

Figure 10:
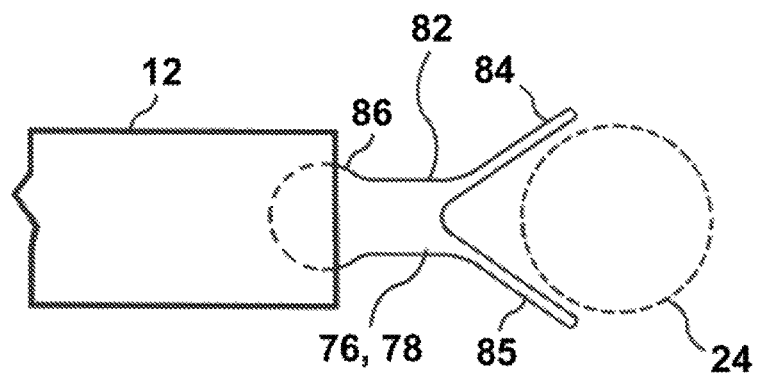
FIG. 10 is an alternative embodiment of the terminal contact pad of the compact battery clamp of FIG. 18.

FIG. 10 provides a detail top view of a terminal contact pad 76. The terminal contact pad 76 includes an attachment end 86 for mechanical and electrical coupling to the end of the clamp handle 12. Although the illustration shown a rotatable attachment configuration, such as a ball and socket interface, the terminal contact pad 76 may be rigidly fixed to the clamp handle in an alternative embodiment. The terminal contact pad 76 further includes a pad body 82 extending from the attachment end 86, and includes two opposed pad fingers 84, 85 extending from the body pad 82, the pad fingers 84, 85 forming a substantially "V-shape" as shown.

The pad fingers 84, 85 also have a narrow thickness which allows for a cantilever-type of flexing when a user pushes the terminal contact pad 76 onto the battery terminal 24. This causes the pad fingers 84, 85 to produce a compressive force against the battery terminal 24 which results in an optimal mechanical and electrical contact with the battery terminal 24. A terminal contact pad 78, shown in FIG. 18, is substantially similar to the terminal contact pad 76, but is sized to conform to the battery terminal 22.

Figure 11:
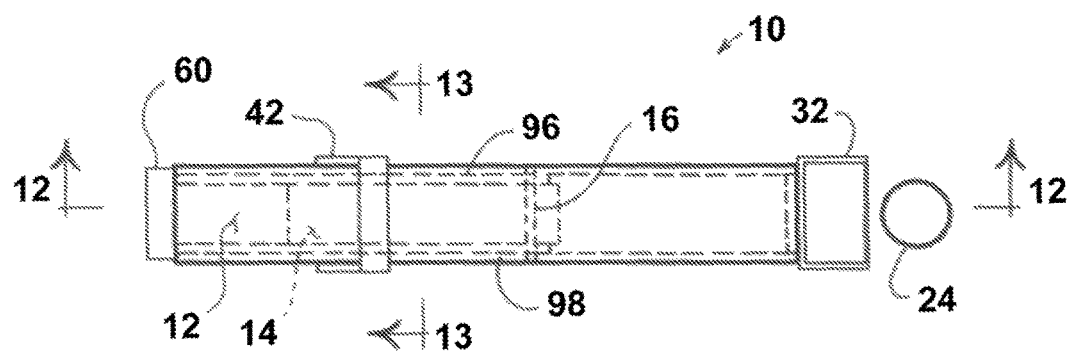
FIG. 11 is a diagrammatical top view of the compact battery clamp of FIG. 1.

FIG. 11 provides a top view of the compact battery clamp 10 of FIG. 1. As can be seen in FIG. 11 and in the cross-sectional view of FIG. 12, the electrical socket 60 is provided at a second end of the cross sectional U-shaped channel clamp handle 12. In an exemplary embodiment, the electrical socket 60 comprises a first electrical connector 92 and a second electrical connector 94. The electrical socket 60 allows for a pair of insulated electrical cables 292, shown in FIG. 35 below, to be plugged into the compact battery clamp 10 for use in "jumping" a lead-acid battery, for example, as is well-known in the relevant art. Preferably, the electrical connectors 92 and 94 form a polarized set so as to permit only one connection orientation when attaching the electrical cables 292 to the compact battery clamp 10.

As the electrical cables 292 can be attached or removed as desired, the combination of two compact battery clamps 10 and the pair of electrical cables 282 provide for a booster cable assembly 290, shown in FIG. 35, that is more compact, and less likely to tangle, than a conventional set of battery jumper cables or booster wires that use crocodile clip battery terminal attachment means.

Figure 12:
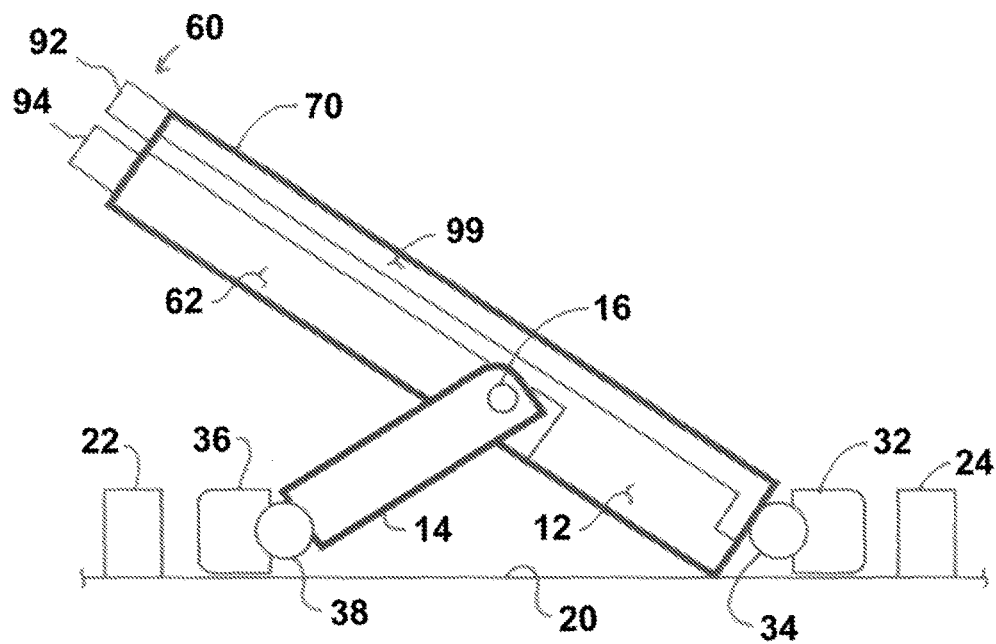
FIG. 12 is a longitudinal cross sectional view of the compact battery clamp of FIG. 8 showing first and second electrical conductors providing an electrical path between battery terminals and an electrical socket.
Figure 13:
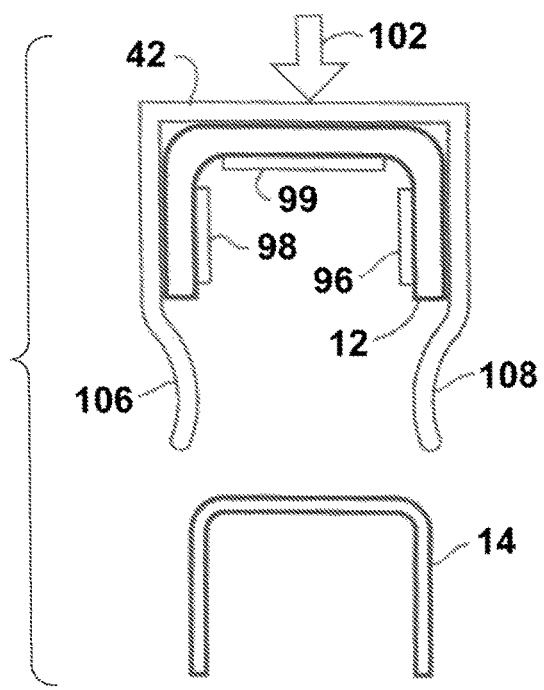
FIG. 13 is transverse cross-sectional view of the compact battery clamp of FIG. 11 showing first, second, and third electrical conductors providing an electrical path between battery terminals and the electrical socket of FIG. 12.

As best seen in FIG. 12 and in the cross-sectional view of FIG. 13, a first electrical conductor 96 is provided between the electrical connector 94 and the pivot pin 16. Similarly, as seen in FIG. 11, a second electrical conductor 98 is provided between the electrical connector 94 and the pivot pin 16. The electrical conductors 92 and 94 may each comprise a thick, but narrow, bar of electrically-conductive material, such as copper or aluminum. The electrical conductors 96 and 98 are of sufficient cross sectional area, and have sufficient conductance, so as to permit the flow of electrical current sufficient to charge the battery 20, for example.

As also seen in FIGS. 12 and 13, a third electrical conductor 99 may be provided between the electrical connector 92 and the swivel connector 94. The third electrical conductor 99 may similarly comprise a thick, but narrow, bar of electrically-conductive material, such as copper or aluminum, having a sufficient cross sectional area and conductance so as to permit the return flow of electrical current for charging purposes.

It can thus be appreciated by one skilled in the art that a first electrical path runs from the electrical connector 92, through the third electrical conductor 99, through the swivel connector 34, through the terminal contact pad 32, and to the battery terminal 24. A second electrical path runs from the electrical connector 94, through both the first electrical conductor 96 and the second electrical conductor 98, through the pivot pin 16, through the contact arm 14, through the swivel connector 38, through the terminal contact pad 36, and to the battery terminal 22. In an exemplary embodiment, an insulating layer 70 may be provided on the surface of the clamp handle 12 to reduce the risk of electrical shorts during emplacement and positioning of the compact battery clamp 10 between the battery terminals 22 and 24, and near protruding metal components, such as may be found in the engine compartment of a motorized vehicle.

As also shown in the cross-sectional view of FIG. 13, the U-spring clamp 42 comprises a first flexible clamp leg 106 and a second flexible clamp leg 108. When the clamp handle 12 is pushed towards the contact arm 14, as indicated by arrow 102, the flexible clamp legs 106 and 108 bear against the sides of the contact arm 14 to prevent movement of the clamp handle 12 away from the contact arm 14, as explained above.

Figure 14:
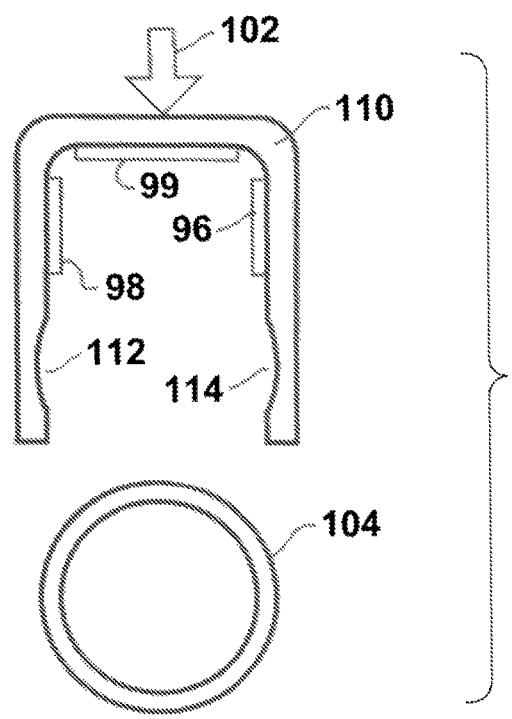
FIG. 14 is a transverse cross-sectional view of an alternative configuration of a clamp handle for use with a tubular control arm.

In an alternative exemplary embodiment, shown in FIG. 14, the channel-shaped contact arm 14 of FIG. 13 may be replaced by a tubular contact arm 104. Accordingly, in this alternative embodiment, the combination of the clamp handle 12 and the U-spring clamp 42 may be replaced by a clamp handle 110 comprising interior concave recesses 112 and 114, as shown, for retention of the tubular contact arm 104. When the clamp handle 110 is pushed onto the tubular control arm 104, the tubular control arm 104 may enter the clamp handle 110 and engage both the recesses 112 and 114. This can function to place the corresponding clamp handle 12 into a state of compression between battery terminals or vehicle battery cable clamps, as explained in greater detail above.

Figure 15:
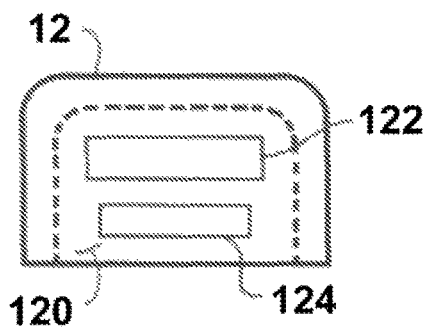
FIG. 15 is a diagrammatical illustration of an exemplary embodiment of an electrical socket having horizontal polarized socket slots.

It should be understood that the configuration of the mating socket openings in the electrical socket 60 is not limited to any one particular geometric shape. As shown in FIG. 15, an electrical socket 120 may be emplaced on the end of the clamp handle 12. The electrical socket 120 includes a first slot opening 122, and a second, smaller slot opening 124, where the slot openings 122 and 124 form a polarized pair of parallel slots having longer widths than heights. Accordingly, the electrical cable 292 of FIG. 35 would include spade-like plugs (not shown for clarity of illustration) to mate with the slot openings 122 and 124.

Figure 16:
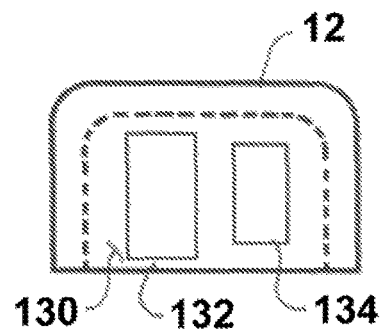
FIG. 16 is a diagrammatical illustration of another exemplary embodiment of an electrical socket having vertical polarized socket slots.

In an exemplary alternative embodiment, shown in FIG. 16, an electrical socket 130 includes a first slot opening 132, and a second, smaller slot opening 134, where the slot openings 132 and 134 form a polarized pair of parallel slots having larger heights than widths. Alternatively, the electrical socket 60 may include two slots (not shown) oriented as ninety degrees to one another rather than having a parallel orientation.

Figure 17:
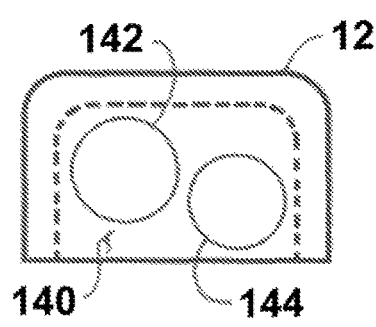
FIG. 17 is a diagrammatical illustration of still another exemplary embodiment of an electrical socket having circular socket openings.

In an exemplary alternative embodiment, shown in FIG. 17, an electrical socket 140 includes a first circular opening 142, and a second circular opening 144, where the diameter of the first circular opening 142 is different from the diameter of the second circular opening 144. Accordingly, the electrical cable 292 of FIG. 35 would include cylindrical termination plugs (not shown for clarity of illustration) to mate with the circular openings 142 and 144.

In yet another exemplary alternative embodiment, shown in FIG. 18, an electrical socket 150 includes a coaxial-type configuration, in which a center electrical contact pin 152 is positioned inside a generally cylindrical conductive layer 154. Accordingly, the electrical cable 292 of FIG. 35 would include a coaxial-type plug (not shown for clarity of illustration) at each end of the electrical cable, to mate with the coaxial-type socket 150. It can be appreciated that, no matter which configuration of electrical socket is used with the clamp handle 12, the electrical cable 292 of FIG. 35 will include appropriate mating plugs, where the mating plugs can be electrically connected to the electrical socket 120, to the electrical socket 130, to the electrical socket 140, or to the electrical socket 150, as is well-known in the relevant art.

Figure 19:
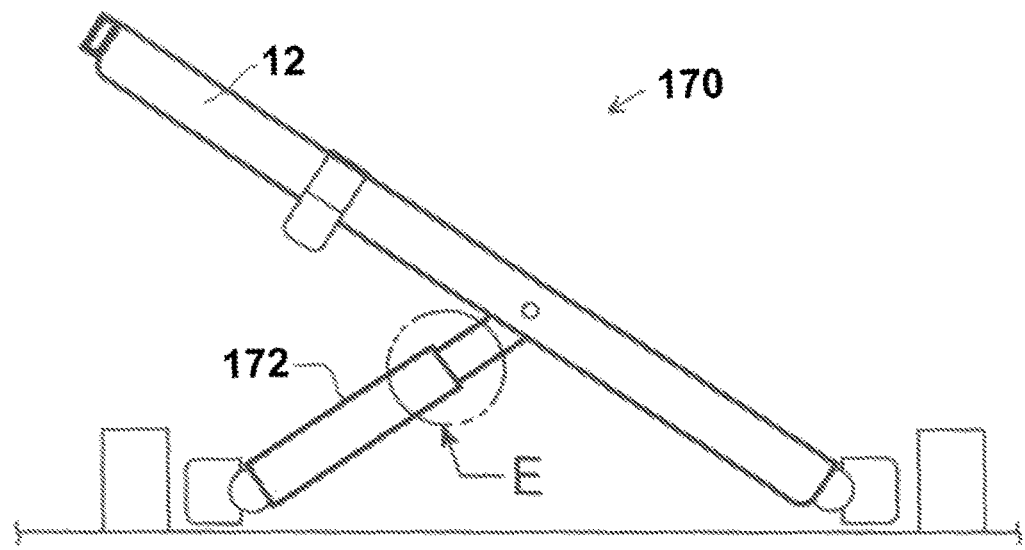
FIG. 19 is a diagrammatical illustration of an alternative embodiment of a compact battery clamp with an adjustable two-component control arm, in accordance with an aspect of the present invention.
Figure 20:
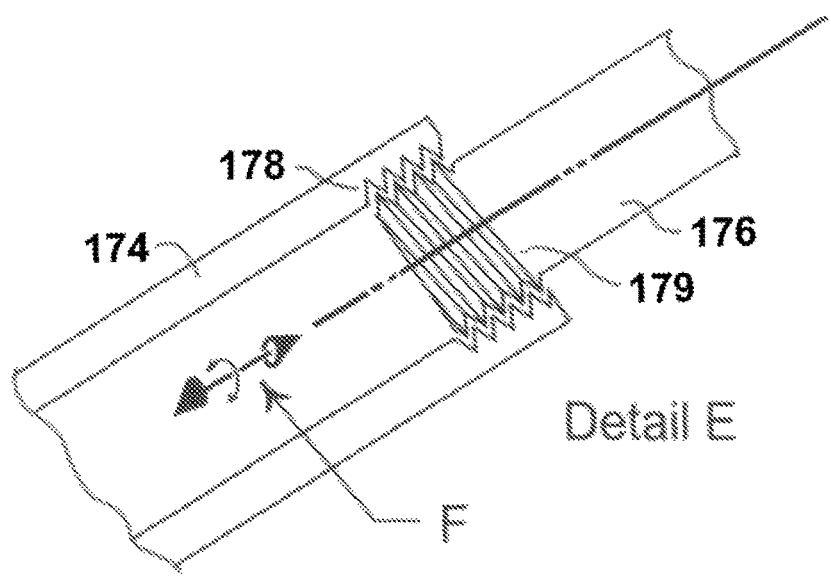
FIG. 20 is a detail illustration of the threaded connection for the two components of the control arm of FIG. 19.

In an exemplary embodiment, shown in FIG. 19 and the detail view of FIG. 20, a compact battery clamp 170 comprises the clamp handle 12 and a cylindrical contact arm 172. The length of the contact arm 172 may be adjusted by rotating a lower tubular member 174 with respect to an upper cylindrical member 176, as indicated by arrow "F." This adjustment feature allows a single compact battery clamp 170 to be used on different batteries, having different terminal-to-terminal dimensions, denoted as dimension "A" in FIG. 1, as described above.

The adjustment feature may include an internal thread 178 formed in the lower tubular member 174, and an external thread 179 formed on the upper cylindrical member 176, for example. That is, the lower tubular member 174 thus has a threaded interface with the upper cylindrical member 176. The upper cylindrical member 176 may comprise a solid rod, or a hollow tube, as may be specified by a product designer. Alternatively, a chuck-like configuration (not shown) can be included on the upper end of the lower tubular member 174, to enable a sliding adjustment of the upper cylindrical member 176 into and out of the lower tubular member 174, as can be appreciated by one skilled in the art.

Figure 21:
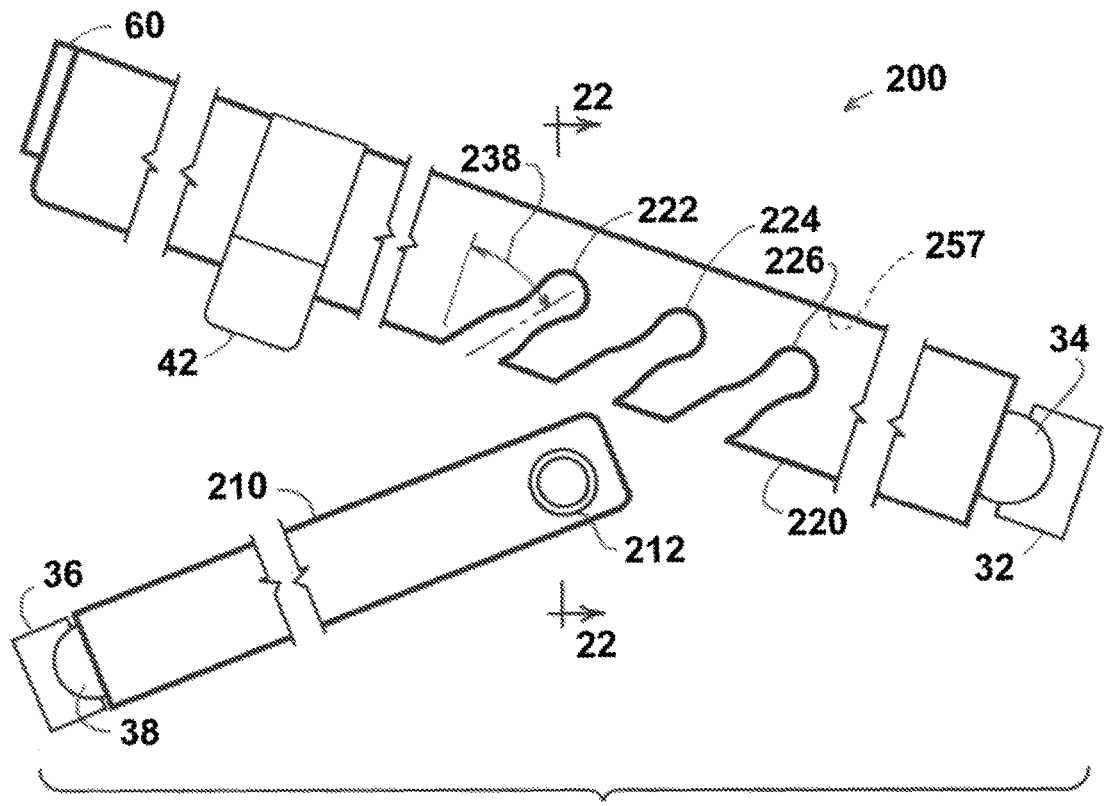
FIG. 21 is a diagrammatical illustration of an embodiment of a two-piece polarized battery clamp with a contact handle and a contact arm, in accordance with the present invention.

There is shown in FIG. 21 an exemplary embodiment of a two-piece polarized battery clamp 200 comprising a contact arm 210 and a contact handle 220. The contact arm 210 includes a stepped pivot pin 212 installed at one end of the contact arm 210, and the terminal contact pad 36 and the swivel connector 38 attached to the other end of the contact arm 210. The contact handle 220 includes the electrical socket 60 attached to one end of the contact handle 220, and the terminal contact pad 32 and the swivel connector 34 attached to the other end of the contact handle 220.

The contact handle 220 also includes a left positional slot 222, a middle positional slot 224, and a right positional slot 226 for selectively retaining the stepped pivot pin 212 and the contact arm 210, as described in greater detail below. The left positional slot 222 is oriented at an angle 238 to insure that, when the polarized battery clamp 200 is properly positioned on a battery, the contact arm 210 is forced into position against an electrical contact bus 234 on a channel bottom surface 257, shown in FIG. 22, inside the contact handle 220 such that an electrical path is completed from the positive battery terminal 22 to the connector 60, as described in greater detail below with reference to FIG. 34. An optimal angle orientation for the middle positional slot 224, and for the right positional slot 226 may be the same angle as or a different angle from the angle 238.

Figure 22:
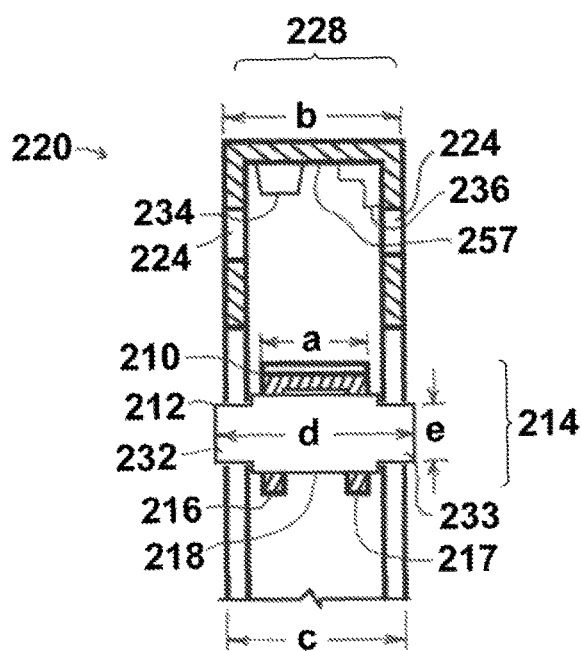
FIG. 22 is a cross-sectional view of the two-piece polarized battery clamp of FIG. 22.

FIG. 22 shows a cross section view of the polarized battery clamp 200 of FIG. 21. The contact arm 210 is formed as a generally resilient and non-electrically conductive U-shaped channel 214, of outside dimension "a," as shown in the diagram. The contact arm 210 may comprise an electrically non-conducting or insulating material, such as a high-impact plastic or a composite material, with internally-disposed electrical conductors as described in greater detail below. The stepped pivot pin 212 is frictionally retained in a first channel side wall 216 and in a second channel side wall 217 of the U-shaped channel 214, preferably in a press-fit configuration. Insertion of the stepped pivot pin 212 into the contact arm 210 positions stepped-down pin sections 232 and 233 in a protruding state from the U-shaped channel 214. The diameters of the stepped-down pin sections 232 and 233 are denoted herein as each having dimension "e."

The contact handle 220 is formed as a generally U-shaped channel 228 having an outside dimension denoted as "b." The U-shaped channel 228 may likewise be fabricated from an electrically non-conducting or insulating material, such as a high-impact plastic or a composite material. The outside dimension "a" of the U-shaped channel 214 is smaller than an inside dimension "c" of the U-shaped channel 228. This configuration allows for placement of the contact arm 210 inside the U-shaped channel 228, except for the stepped pivot pin 212. The length of a pivot pin body 218, that is, from pin shoulder to pin shoulder, is greater than the dimension "a," but less than the dimension "c."

The overall length "d" of the stepped pivot pin 212 is greater than the outside dimension "b" of the U-shaped channel 228. The relative configurations of the contact arm 210 and the contact handle 220 allow for placement of the contact arm 210 inside the contact handle 220, provided that the stepped pivot pin 212 is guided into one pair of the positional slots 222, 224, or 226. This placement of the stepped pivot pin 212, in turn, allows for the contact arm 210 to make contact with an electrical contact bus 234 disposed inside the contact handle 220, as explained in greater detail below. The electrical contact bus 234 is connected to a positive, or "hot," lead inside the electrical connector 60. The conductive U-shaped channel 214 of the contact arm 210 serves to provide strength and rigidity, while allowing rotational movement of the contact arm 210 within the open region inside the contact handle 220.

Figure 23:
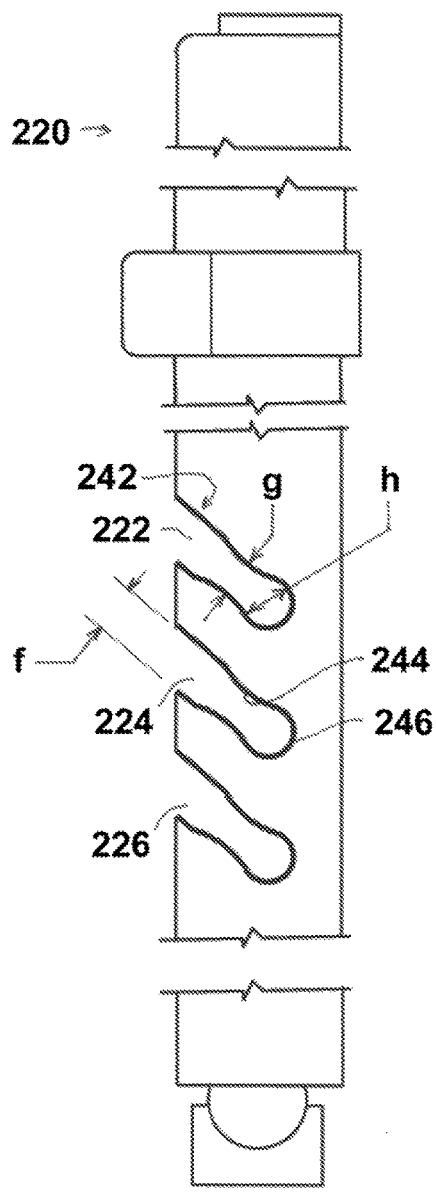
FIG. 23 is a side view of the two-piece polarized battery clamp of FIG. 22, showing three positional slots.

FIG. 23 is a side view of the contact handle 220, showing the positional slots 222, 224, and 226. Each of the six positional slots 222, 224, and 226 includes a slot opening region 242, a necked-down detent region 244, and a pin terminus 246. In an exemplary embodiment, the width of the slot opening region 242, herein denoted as dimension "f," is approximately the size of the diameter "e" of the stepped-down pin sections 232 and 233 to provide for insertion of the stepped-down pin sections 232 and 233 into the respective positional slot pairs 222, 224, and 226. The width of the necked-down detent region 244 is less than the diameter "e" of the stepped-down pin sections 232 and 233. The diameter of the pin terminus 246 is substantially the same as "e," the diameter of stepped-down pin sections 232 and 233. This positional slot configuration thus provides two operational positions for the stepped pivot pin 212. A first position is placement in the slot opening 242, "before" the necked-down detent region 244. A second position is in the pin terminus 246, after the stepped-down pin sections 232 and 233 have been forced through the opposed necked-down detent regions 244.

Figure 24:
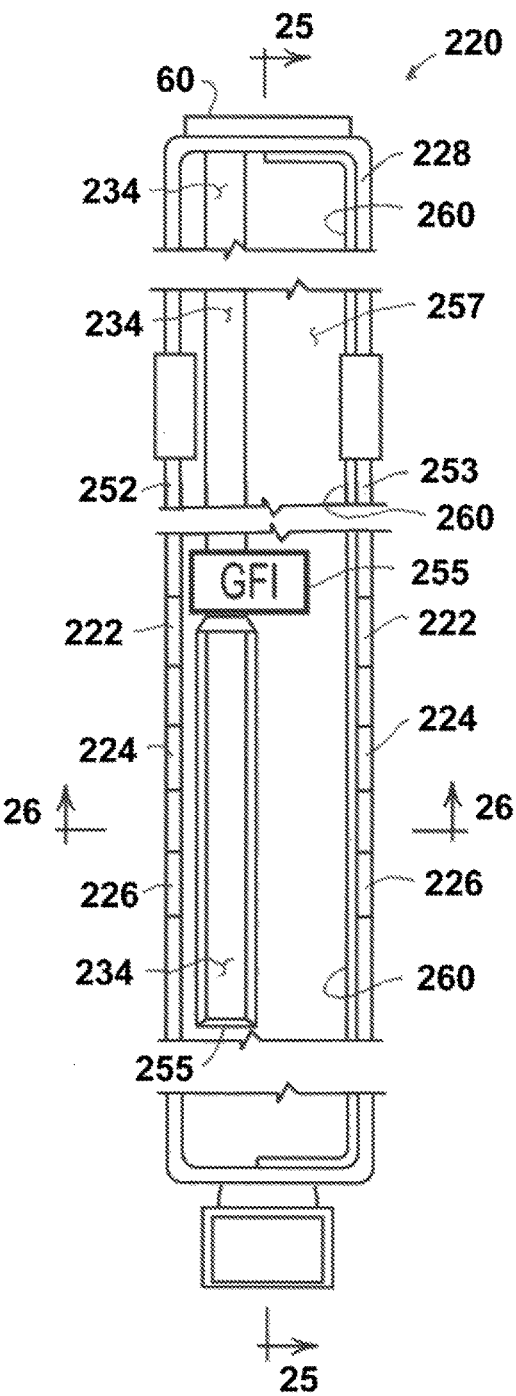
FIG. 24 is a cross-sectional view of the two-piece polarized battery clamp of FIG. 22, showing internal conductive paths and a ground fault interrupter.

FIG. 24 is a bottom view of the contact handle 220 in FIG. 23. In this view, it can be seen that the U-shaped channel 228 includes a first sidewall 252 and a second sidewall 253. It should be understood that three of the six positional slots 222, 224, and 226 are formed in the sidewall 252, and three of the six positional slots 222, 224, and 226 are formed in the sidewall 253. Accordingly, the stepped-down pin section 232 may pass into the positional slot 222 in the sidewall 252, and the stepped-down pin section 233 may pass into the opposed positional slot 222 in the sidewall 253. In the illustration, it can also be seen that the electrical contact bus 234 extends from the electrical connector 60 to a distal contact bus end 255. A ground fault interrupter (GFI) 255 may be optionally included as part of the electrical circuit, coupled to the electrical contact bus 234, between the electrical connector 60 and the distal contact bus end 255, to prevent or shut down a surge of electrical current passing through the electrical contact bus 234 in cases where a user of the polarized battery clamp 200 is unfamiliar with proper electrical polarity. The electrical contact bus 234 and the ground fault interrupter 255 may be physically attached to a channel bottom surface 257 of the contact handle 220, as best seen in the cross sectional view of FIG. 26.

The contact handle 220 further includes a ground-side conductive path 260 disposed on the sidewall 253. Alternatively, the ground-side conductive path 260 may be disposed partially on the sidewall 253 and partially on the channel bottom surface 257, or entirely on the channel bottom surface 257. The ground-side conductive path 260 may comprise copper sheet, or a similar type of electrical conductor material with a large conductance and/or a sufficient cross-sectional area to pass a current level large enough to supply charging current to a battery without causing thermal issues in the polarized battery clamp 200. The layout of the ground-side conductive path 260 is best seen in the sectional view shown in FIG. 25. The ground-side conductive path 260 provides an electrical path from the negative, or "ground," lead in the electrical connector 60.

In an exemplary embodiment, the ground-side conductive path 260 may include a first tab 262 protruding into the positional slot 222, a second tab 264 protruding into the positional slot 224, and a third tab 266 protruding into the positional slot 226, It should be understood that, as the positional slots 222, 224, and 226 provide a means of adjusting the polarized battery clamp 200 to make electrical contact with battery terminals spaced apart at varying dimensions, the polarized battery clamp 200 may include: (i) only one or two positional slots, or (ii) more than three, positional slots to accommodate a wider selection of post-type lead acid batteries, for example.

Figure 27:
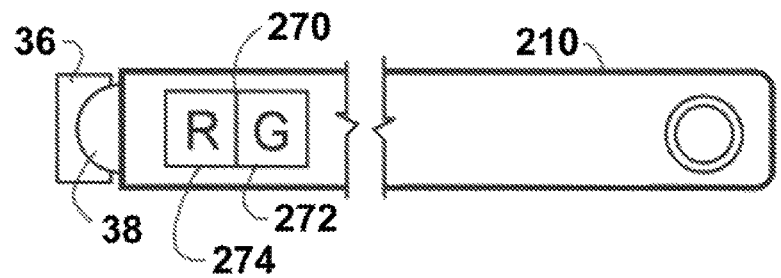
FIG. 27 is a side view of the contact arm of FIG. 21.

The contact arm 210, may include an optional polarity indicator 270 to provide a warning to a user of the polarized battery clamp 200 if the terminal contact pads have not been correctly positioned in FIG. 27. If proper polarity is achieved, a green indicator 272 will illuminate. Otherwise, a red indicator 274 will provide a warning that the polarized battery clamp 200 should be removed from the battery terminals, reversed, and replaced on the battery.

In an exemplary embodiment, the polarity indicator 270 can also function as a voltage meter to indicate whether the battery is acceptably charged, or undercharged. Placement of the polarized battery clamp 200 onto battery terminals will illuminate the green indicator 272 to show that the battery is below a predetermined voltage threshold level. For example, if the battery is not in a discharged state and is providing at least ten volts, the green indicator will illuminate. On the other hand, if the red indicator 274 illuminates, this may validate a battery voltage level of less than ten volts, for example. It can be appreciated by one skilled in the art that the threshold voltage level can be set as desired by the manufacturer or by the user.

Figure 28:
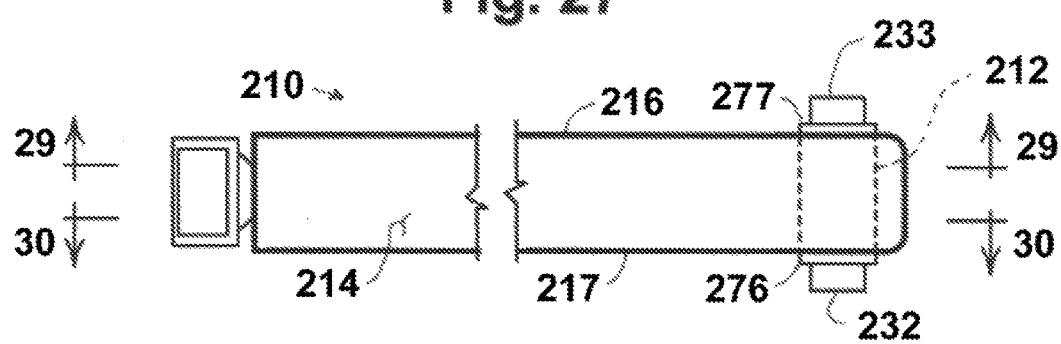
FIG. 28 is a top view of the contact arm of FIG. 27.

FIG. 28 is a top view of the contact arm 210 which more clearly shows that portions of both shoulders 276, 277 and the entire stepped-down pin sections 232 and 233 protrude from the U-shaped channel 214. This configuration functions to provide a small gap between the contact arm 210 and the inside of the contact handle 220 to prevent binding. This configuration also serves to enable the stepped pivot pin 212 to selectively engage the positional slot pairs 222, 224, or 226 in the contact handle 220.

Figure 29:
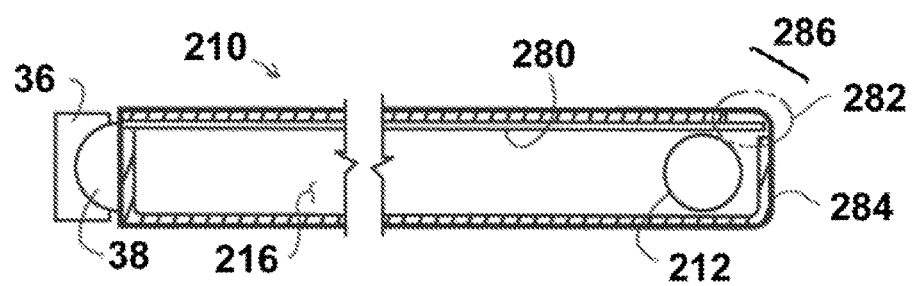
FIG. 29 is a cross sectional view of a first side of the contact arm of FIG. 27.

FIG. 29 is a cross-sectional view of the interior of the contact arm 210, looking at the interior surface of the first channel sidewall 216. In this view, there is shown an electrical conductor 280 providing an electrical path from the terminal contact pad 36 and the swivel connector 38 at one end of the contact arm 210 to a distal end 284 of the contact arm 210. The electrical conductor 280 is of sufficient cross section and conductance to pass a current sufficient to charge a battery without producing an unacceptable voltage drop or power loss in the contact arm 210. A cantilever conductive segment 282 of the electrical conductor 280 is left exposed, by providing an opening 286 in the U-shaped channel 214. This open access to the cantilever conductive segment 282 enables the cantilever conductive segment 282 (i) to be flexibly pressed against and (ii) to make electrical contact with the electrical contact bus 234, as explained in greater detail below. It should be noted that no portion of the electrical conductor 280 makes any physical or electrical contact with the stepped pivot pin 212. An electrically insulating coating (not shown) can be applied to exposed areas of the electrical conductor 280 to prevent the occurrence of electrical shorting to an electrical trace 288, shown in FIG. 30.

Figure 30:
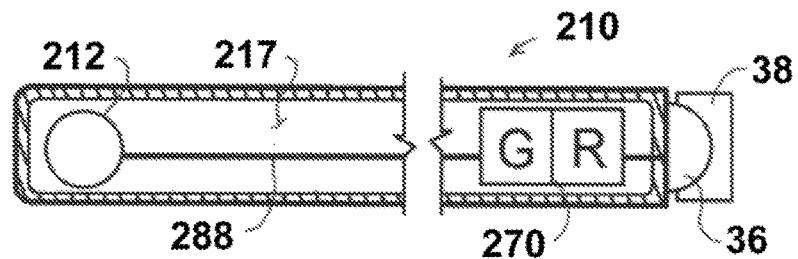
FIG. 30 is a cross sectional view of a second side of the contact arm of FIG. 27.
Figure 31:
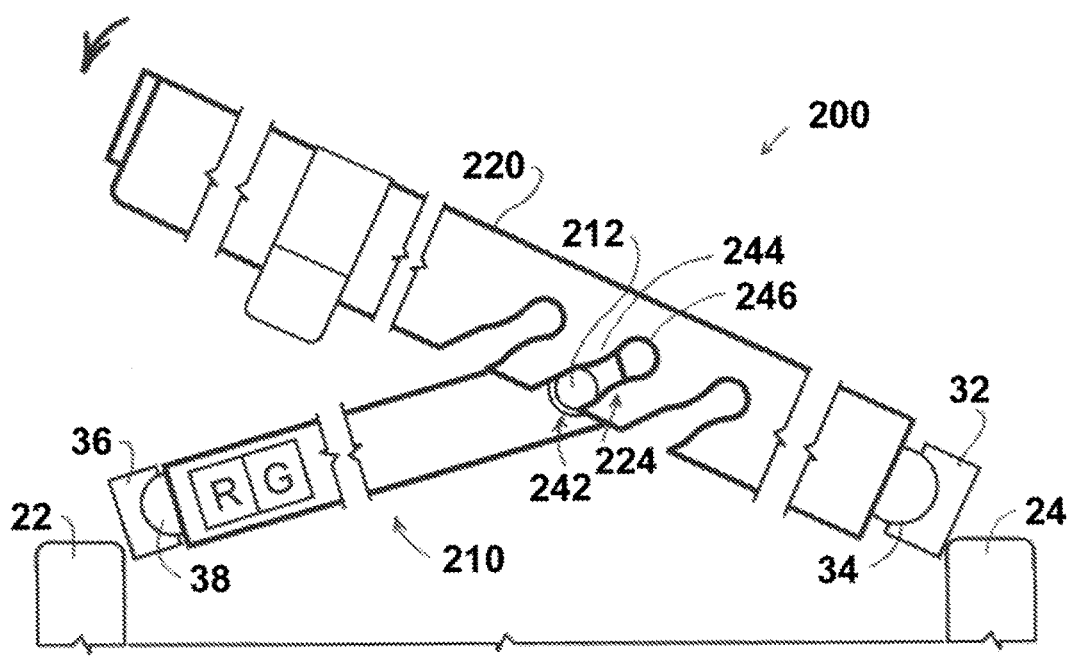
FIG. 31 is a view of the two-piece polarized battery clamp of FIG. 21 illustrating a method of verifying proper polarity on a battery.

FIG. 30 is an opposed sectional view of the interior of the contact arm 210 looking at the inside surface of the second channel sidewall 217. In this view, it can be seen that the electrical trace 288 provides a low-current electrical path from the terminal contact pad 36 and the swivel connector 38 at one end of the contact arm 210, through the polarity indicator 270, to the stepped pivot pin 212 in the contact arm 210. Current flows in the electrical trace 288 when the polarized battery clamp 200 first makes contact with the battery terminals 22 and 24, shown in FIG. 31. In this position, the stepped pivot pin 212 has been inserted into the slot opening 242 of the middle positional slot 224. The necked-down detent region 244 prevents the stepped pivot pin 212 from moving into the pin terminus 246 until the user applied a downward force to the contact handle 220.

Figure 32:
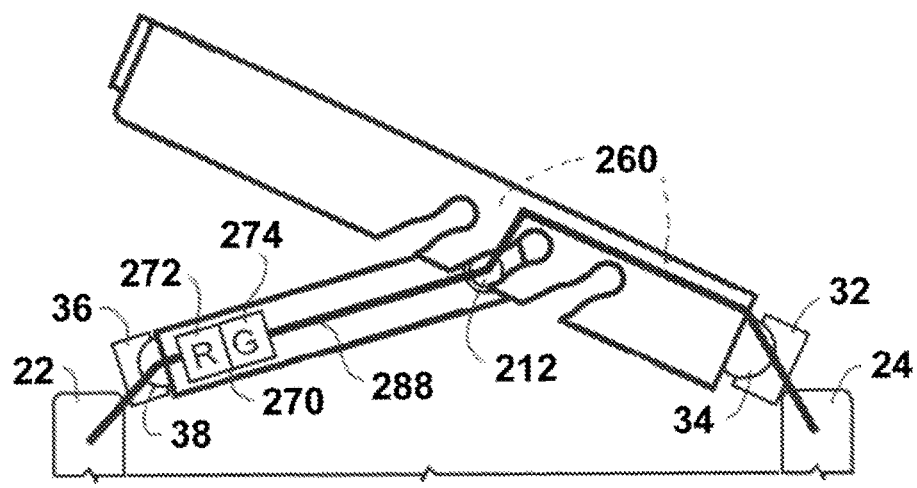
FIG. 32 is a simplified diagram illustrating electrical current flow in the configuration of FIG. 31.

Preferably, the terminal contact pad 36 and the swivel connector 38 make electrical contact with the positive battery terminal 22, and the terminal contact pad 32 and the swivel connector 34 make electrical contact with the negative battery terminal 24. In this correct orientation, the green indicator 272 should illuminate to indicate the correct polarity of the polarized battery clamp 200. Otherwise, the red indicator 274 illuminates to indicate an incorrect method of attachment. FIG. 32 is a simplified diagram with a bold line illustrating the current flow in the emplaced polarized battery clamp 200 when checking polarity, or when checking the voltage reading of a battery.

An illuminated green indicator 272 may verify an adequately-charged battery of about ten to twelve volts, for example. An illuminated red indicator 274 on a properly-oriented polarized battery clamp 200 may be an indication that the battery requires charging. When sensing voltage, or verifying correct polarity, the electrical current leaves the positive battery terminal 22, travels through the terminal contact pad 36 and the swivel connector 38, travels through the polarity indicator 270, travels along the electrical trace 288 to the stepped pivot pin 212, travels through the ground-side conductive path 260 into the swivel connector 34 and the terminal contact pad 32, and returns to the negative battery terminal 24.

Figure 33:
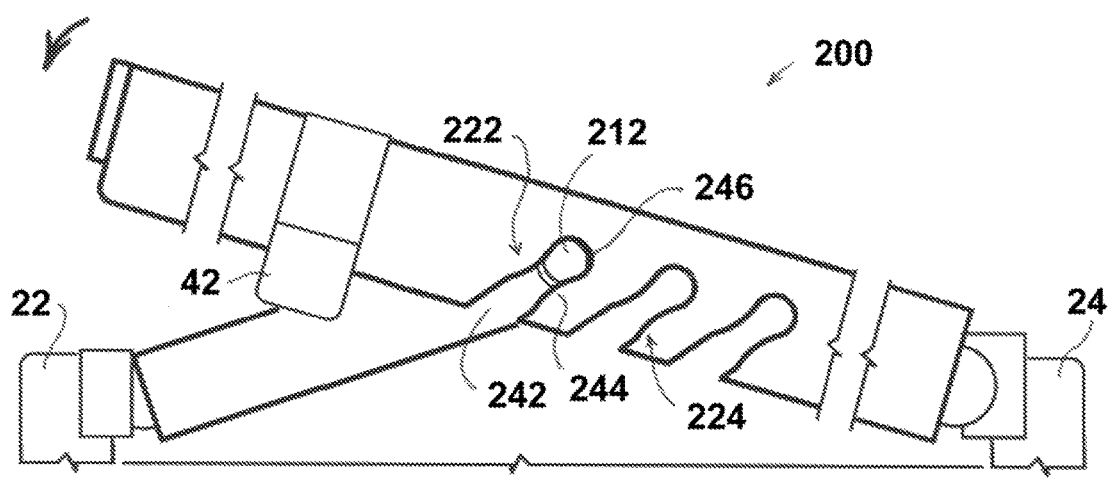
FIG. 33 is a view of the two-piece polarized battery clamp of FIG. 21 illustrating a method of charging a battery.

FIG. 33 shows the next step in attaching the polarized battery clamp 200 to the battery terminals 22, 24. The user has determined that the left positional slot 222 provides a better fit than does the middle provisional slot 224. The user subsequently inserts the stepped pivot pin 212 into the left positional slot pair 222, and forces the stepped pivot pin 212 into the pin terminus 246. The U-spring clamp 42 clamps onto the contact arm 210 so as to releasably retain the polarized battery clamp 200 in the engaged position against the battery terminals 22, 24. The necked-down detent regions 244 in the left positional slot pair 222 prevents the stepped pivot pin 212 from moving back into the slot openings 242 of the left positional slot pair 222 until the user has applied a sufficient upward force to the contact handle 220.

Figure 34:
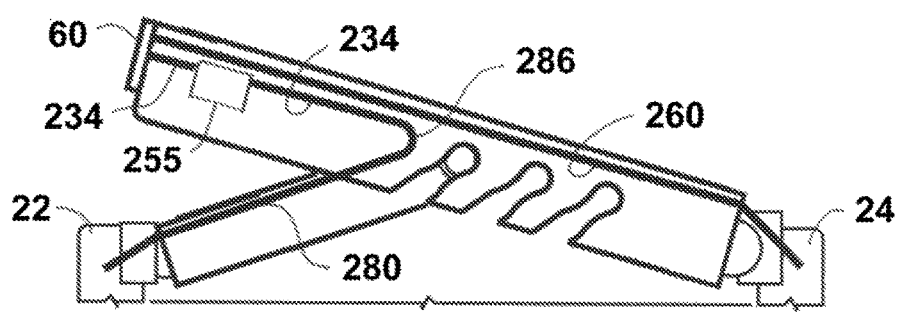
FIG. 34 is a simplified diagram illustrating electrical current flow in the battery charging configuration of FIG. 33.

FIG. 34 is a simplified diagram illustrating the charging current flow in the emplaced polarized battery clamp 200 when preparing to charge a battery. In this configuration, charging current flows via a positive connection in the electrical connector 60 into the contact handle 220, along the electrical contact bus 234, through the ground fault interrupter 255, if provided, farther along the electrical contact bus 234 to the cantilever conductive section 286, along the electrical conductor 280, and to the positive battery terminal 22. An electrical current return is provided by the ground-side conductive path 260 which connects the negative battery terminal 24 to a negative connection in the electrical connector 60.

There is shown in FIG. 35 an exemplary embodiment of a booster cable assembly 290 as may be used in charging a discharged battery 26 with a charged battery 20, for example. Alternatively, a battery charger (not shown) can be used in place of the charging battery 20, as is well-known in the relevant art. The innovative booster cable assembly 290 includes the high-amperage, two-conductor, insulated electrical cable 292, or an equivalent insulated cable pair, where the electrical socket 60 of the polarized battery clamp 200 is electrically and physically coupled to one end of the insulated electrical cable 292. The other end of the insulated electrical cable 292 is electrically and physically coupled to the electrical socket 60 of a second polarized battery clamp 200. This modular configuration provides for quick and easy disassembly and storage, without the common problem of tangled "crocodile clip" clamps and uncoiled cable.

For clarity of illustration, the booster cable assembly 290 is shown attached to the battery posts of the batteries 20 and 26, but it should be understood that the polarized battery clamp 200 may be used as well when vehicle battery cable terminals remain emplaced on the battery posts of one or both batteries 20, 26.

It is to be understood that the description herein is only exemplary of the invention, and is intended to provide an overview for the understanding of the nature and character of the disclosed booster cable and two-piece polarized battery clamp configurations. The accompanying drawings are included to provide a further understanding of various features and embodiments of the method and devices of the invention which, together with their description and claims serve to explain the principles and operation of the invention.

What is claimed is:

1. A polarized battery clamp suitable for attachment to a high-amperage, two-conductor, insulated electrical cable for charging a battery, said battery clamp comprising:
    a contact handle with at least one positional slot, said contact handle having a ground-side conductive path electrically connecting an electrical connector at a first end of said contact handle to a contact handle terminal contact pad at a second end of said contact handle, said contact handle further having an electrical contact bus with a first bus end connected to said electrical connector; and
    a contact arm having a contact arm terminal contact pad at a first end of said contact arm and a stepped pivot pin at a second end of said contact arm, said contact arm further having an electrical conductor with a first electrical conductor end electrically connected to said contact arm terminal contact pad;
    wherein a second end of said electrical conductor is placed into electrical contact with a second end of said electrical contact bus by inserting said stepped pivot pin into said at least one positional slot.

2. The polarized battery clamp of claim 1 wherein said contact handle comprises a ground fault interrupter coupled to said electrical contact bus.

3. The polarized battery clamp of claim 1 wherein said at least one positional slot comprises a first slot opening region, a first necked-down detent region adjacent said first slot opening region, and a first pin terminus adjacent said first necked-down detent region, said first pin terminus having a diameter substantially the same as a diameter of a first stepped-down pin section of said stepped pivot pin.

4. The polarized battery clamp of claim 3 wherein said contact handle electrical contact bus extends into said pin terminus region such that said contact arm electrical conductor is placed into electrical contact with said electrical contact bus when said contact arm stepped pivot pin is placed into said contact handle pin terminus.

5. The polarized battery clamp of claim 3 wherein said contact handle further comprises a second positional slot with a second pin terminus opposed to said first pin terminus, such that insertion of said first stepped-down pin section of said stepped pivot pin into said first pin terminus enables insertion of a second stepped-down pin section of said stepped pivot pin into said second pin terminus.

6. The polarized battery clamp of claim 5 wherein said contact handle further comprises a first sidewall and a second sidewall, such that said contact handle has a substantially U-shaped cross section, wherein said at least one positional slot is disposed in said first sidewall and said second positional slot is disposed in said second sidewall.

7. The polarized battery clamp of claim 6 wherein said contact arm is configured to fit inside said contact handle.

8. The polarized battery clamp of claim 1 wherein said electrical connector comprises two leads such that said ground-side conductive path is electrically connected to first lead in said electrical connector, and said electrical contact bus is electrically connected to second lead in said electrical connector.

9. The polarized battery clamp of claim 1 wherein said contact arm comprises an electrical trace disposed on an inside surface of said contact arm, said electrical trace electrically connecting said contact arm terminal contact pad to said stepped pivot pin.

10. The polarized battery clamp of claim 9 wherein said contact arm further comprises a polarity indicator coupled to said electrical trace, said polarity indicator functioning to indicate at least one of (i) correct placement of said polarized battery clamp on the battery, and (ii) charge status of the battery.

11. The polarized battery clamp of claim 1 wherein said contact arm further comprises an opening at said second end of said contact arm such that an electrical conductor second end terminates in a cantilever conductive segment that is accessible to selectively contact said second end of said contact bus through said contact arm opening.

12. A method suitable for attaching a battery clamp to battery terminals, said method comprising the steps of:
    obtaining a contact handle having a conductive path electrically connecting a first lead in an electrical connector at a first end of said contact handle to a contact handle terminal contact pad at a second end of said contact handle, said contact handle further having an electrical contact bus with a first bus end connected to a second lead in said electrical connector, said contact handle additionally having a first positional slot in a first sidewall and an opposed second positional slot in a second sidewall;
    obtaining a contact arm having a contact arm terminal contact pad at a first end of said contact arm and a stepped pivot pin fixed to a second end of said contact arm, said contact arm further having an electrical conductor with a first electrical conductor end electrically connected to said contact arm terminal contact pad;
    placing said contact handle terminal contact pad against a first battery terminal;
    placing said contact arm terminal contact pad against a second battery terminal; and
    removably attaching said contact arm to said contact handle by inserting a first stepped-down pin section of said stepped pivot pin into said first positional slot and a second stepped-down pin section of said stepped pivot pin into said second positional slot in said contact handle so as to form a battery clamp.

13. The method of claim 12 further comprising the step of, if a polarity indicator in said contact arm indicates an incorrect polarity placement of said battery clamp on the battery when said stepped pivot pin is placed into said first positional slot and said second positional slot, removing said contact arm terminal contact pad from said first battery terminal and repositioning said contact handle terminal contact pad against said second battery terminal.

14. The method of claim 12 further comprising the step of, if a polarity indicator in said contact arm indicates an incorrect polarity placement of said battery clamp on the battery when said stepped pivot pin contacts an electrical trace in said contact arm, removing said contact arm terminal contact pad from said first battery terminal and repositioning said contact handle terminal contact pad against said second battery terminal.

15. The method of claim 12 further comprising the step of, if a polarity indicator in said contact arm indicates a correct polarity placement of said battery clamp on the battery when said stepped pivot pin contacts an electrical trace in said contact arm, pushing down said contact handle over said contact arm so that (i) said first stepped-down pin section is moved into a first pin terminus in said first positional slot and said, and (ii) said second stepped-down pin section is moved into a second pin terminus in said second positional slot.

16. The method of claim 15 wherein said step of pushing down said contact handle comprises the step of moving a cantilever conductive segment of said contact handle electrical conductor against said contact handle electrical contact bus so as to complete an electrical path between said electrical connector and said contact arm terminal contact pad.

17. The method of claim 12 further comprising the step of, if a polarity indicator in said contact arm indicates an incorrect polarity placement of said battery clamp on the battery, preventing a surge of electrical current flow through said battery clamp by coupling a ground fault interrupter to one of said contact handle conductive path or said contact handle electrical contact bus.

18. A polarized battery clamp comprising:
an electrical connector configured for attachment to a high-amperage, two-conductor, insulated electrical cable;
a contact handle having a first contact handle end connected to said electrical connector, said contact handle further including a conductive path, said conductive path connecting a first lead in said electrical connector to a contact handle terminal contact pad at a second end of said contact handle, said contact handle further having an electrical contact bus, said contact bus having a first bus end connected to a second lead in said electrical connector; and
a contact arm having a contact arm terminal contact pad at a first end of said contact arm and a stepped pivot pin attached at a second end of said contact arm, said contact arm further including an electrical conductor disposed on an inside surface of said contact arm, such that a first electrical conductor end is electrically connected to said contact arm terminal contact pad, said contact arm also including an electrical trace disposed on an inside surface of said contact arm, said electrical trace electrically connecting said contact arm terminal contact pad to said stepped pivot pin.

19. The polarized battery clamp of claim 18 wherein said contact handle comprises a substantially U-shaped channel cross section with a first sidewall, a channel bottom, and a second sidewall, said conductive path disposed on an inside surface of said first contact handle sidewall and said electrical contact bus disposed on a channel bottom surface inside said contact handle.

20. The polarized battery clamp of claim 19 wherein said contact handle further comprises a first positional slot disposed in said first sidewall, and a second opposed positional slot disposed in said second sidewall.

* * * * *